United States Patent
Arora

(10) Patent No.: US 8,868,579 B2
(45) Date of Patent: Oct. 21, 2014

(54) RESTRICTED WEB SEARCH BASED ON USER-SPECIFIED SOURCE CHARACTERISTICS

(75) Inventor: Sanjay Arora, Toronto (CA)

(73) Assignee: Exponential Labs Inc., Toronto, Ontario, CA (US)

( * ) Notice: Subject to any disclaimer, the term of this patent is extended or adjusted under 35 U.S.C. 154(b) by 0 days.

(21) Appl. No.: 13/470,806

(22) Filed: May 14, 2012

(65) Prior Publication Data

US 2013/0304719 A1    Nov. 14, 2013

(51) Int. Cl.
*G06F 17/30* (2006.01)

(52) U.S. Cl.
CPC ............................... *G06F 17/30867* (2013.01)
USPC ............ 707/757; 707/727; 707/754; 715/845

(58) Field of Classification Search
CPC ................................................ G06F 17/30867
USPC .................... 707/727, 754, 757; 715/825, 845
See application file for complete search history.

(56) References Cited

U.S. PATENT DOCUMENTS

| | | | |
|---|---|---|---|
| 7,685,224 B2 * | 3/2010 | Nye | 709/201 |
| 7,761,464 B2 * | 7/2010 | Radlinski et al. | 707/769 |
| 7,783,632 B2 * | 8/2010 | Richardson et al. | 707/727 |
| 7,996,391 B2 * | 8/2011 | Castro et al. | 707/723 |
| 2006/0026147 A1 * | 2/2006 | Cone et al. | 707/3 |
| 2011/0004504 A1 * | 1/2011 | Ives et al. | 705/10 |

OTHER PUBLICATIONS

Jonathan Koren et al., "Personalized Interactive Faceted Search", ACM WWW '08, Apr. 21-25, 2008, pp. 477-485.*
Google Developers, "Custom Ranking", last updated Mar. 27, 2012.*
Nora Young, "Full Interview: Sanjay Arora on Million Short", Spark—CBC Radio.ca, audio interview posted May 8, 2012.*
Jon Gold, "Million Short Showcases the Web's Supporting Cast", Network World, posted May 29, 2012.*
Morgan Campbell, "Making the Web Wild Again: New Search Engine Ignores Popular Websites", The Star, May 30, 2012.*
MillionShort.com Home Page and About Page, last visted Jul. 26, 2012.*
Peter Morville & Jeffery Callender, "A List Apart: Design Patterns: Faceted Navigation", Apr. 20, 2010, excerpt from "Search Patterns" chapter 4.*

* cited by examiner

*Primary Examiner* — Rehana Perveen
*Assistant Examiner* — Scott A Waldron
(74) *Attorney, Agent, or Firm* — Kagan Binder, PLLC

(57) ABSTRACT

The present invention is a method and system for searching for items on a computer network, such as the internet, based on a query and an exclusion specification comprising a specification of a characteristic of sources of the items, to create a list of identifiers of items relevant to the query that are not excluded by the exclusion specification. Such characteristics include measures of popularity of the sources of the items so that items from sources having popularity greater than the specified popularity may be excluded from the list.

19 Claims, 3 Drawing Sheets

RESTRICTED WEB SEARCH BASED ON USER-SPECIFIED SOURCE CHARACTERISTICS

FIELD OF THE INVENTION

The present invention relates generally to web searching, and more particularly to methods and systems for web searching that eliminate sites from the search results based on characteristics of the sites.

BACKGROUND OF THE INVENTION

Web search is a critical function used by users of the World-Wide Web ("the web"). The web is a system of interconnected documents accessible via the internet. Web documents ("pages") may contain text, images, video and/or sound recordings that can be accessed via hyperlinks using a web browser. Programs that provide search functionality are generally referred to as web search engines. When presented with a query in the form of a text string, typically including a number of words and/or phrases delimited by quotation marks, such a search engine identifies linked items (such as web pages, documents and images) that it determines best match the user's query. The engine generally ranks the identified items based on relevance to the query, which ranking may take into account many things, such as the perceived value of the item based on the number and characteristics of third parties that link to that item, for example. Then the results are displayed in order of the ranking, for example 10 results per screen.

In some cases, a small number of large and popular sites may dominate the search results because they contain a lot of relevant information, although it may not be the kind of information that a user wishes to see. Also, because of the potential commercial value of being shown near the top of such searches, many websites employ search engine optimization techniques that enhance their ranking by major search engines. The result of this can be that a given search may result in most of the top-ranked search results coming from a few well-known sites, and often many of these results are similar, providing little additional value beyond a first hit on such a site. Often, even the first hit amounts to little more than an advertisement that provides no useful information to the searcher.

Searches can return thousands, and often of millions, of hits in response to a search query, but users typically look at only the first page or two of such results. Such pages may be completely populated by large/popular sites and search-optimized sites, and not include many or any sites that have the type of information that the user is actually trying to find, or may be interested in. Often, there may be information that a searcher would be very interested in, for example from an individual blogger's site that is not particularly popular, but it may be far down in the list of search results and the user is very unlikely to click though hundreds or thousands of pages of search results in order that such results may be displayed.

Generally search engines allow a user to exclude particular sites from the results of a search by naming the sites to be excluded. For example, "-site:domain1.com-site:domain2.com" may be included in the search string to remove results from domain1.com and domain2.com. However, this is inconvenient because it requires the user to predetermine the websites to exclude by name, and type them into the query without typographical errors. While this may be effective for a very small number of sites, it is impractical to use to exclude larger numbers of websites, and it fundamentally requires that the user know the names or URLs of websites that the user wants to exclude. Often the user will not know this until presented with a list of results.

SUMMARY OF THE INVENTION

It is an object of the invention to provide a web search capability that allows users to remove some websites from the search results without having to identify such websites by name.

The present invention provides a method performed by a computer processor to identify items accessible on a computer network that are relevant to a query entered by a user, each item having a source, the method comprising the steps of:
  (a) providing an exclusion specification, the exclusion specification comprising a specification of a characteristic of sources;
  (b) receiving the query from the user; and
  (c) creating a list of identifiers of items relevant to the query, the items being accessible on the computer network from sources that are not excluded by the exclusion specification.

The list may be ordered by declining relevance of the items to the query. The method may further include a step (d) of displaying a portion of the list starting with the first item in the list, the first item being the most relevant item.

The exclusion specification may be provided by the user, or it may be pre-determined.

The characteristic may be a maximum value of a quantitative measure of the popularity of the sources, a smaller value of which measure means that the source is more popular, so that items from sources having a popularity value less than or equal to the specified maximum value are excluded from the list.

The list creation step may comprise:
  (a) identifying an initial list of identifiers of items accessible on the computer network, the items being sorted by relevance of the items to the query;
  (b) for each listed item, identifying the source of the item; and
  (c) removing item identifiers from the list for which the source of the item is excluded by the exclusion specification.

Each source may be assigned a rank equal to the number of distinct sources of items above the first occurrence of an item from that source in the initial list, and the characteristic of sources in the exclusion specification may be a specified maximum rank in the initial list, so that all items from a source with a rank less than or equal to the specified maximum rank are removed from the list. The specified maximum rank may be 1000 or 100,000, for example.

The method may further comprise the steps of:
  (e) presenting to the user a list of sources that were excluded;
  (f) receiving from the user an indication that one of the sources in the list of excluded sources should not be excluded;
  (g) updating the list of identifiers to include items from the source that the user indicated should not be excluded; and
  (h) displaying a portion of the updated list.

The computer network may be the internet, the identifier a uniform resource locator, and the source may be identified by a domain name extracted from the uniform resource locator. The items may comprise web pages.

The relevance of the query to an item may be determined by the appearance in the item, or in text associated with the item, of words or phrases contained in the query.

The item identification step may be performed by querying a third-party search engine.

The invention also includes a system comprising a programmable computer processor, the processor running software adapted to:

(a) receive an exclusion specification, the exclusion specification comprising a specification of a characteristic of sources;
(b) receive a query from a user; and
(c) create a list of identifiers of items relevant to the query, the items being accessible on a computer network from sources that are not excluded by the exclusion specification.

The list created by the system may be ordered by declining relevance of the items to the query, and the software may be further adapted to display a portion of the list starting with the first item in the list.

The creation of the list by the system may comprise:

(a) identifying an initial list of identifiers of items accessible on the computer network, the items being sorted by declining relevance of the items to the query;
(b) for each listed item, identifying the source of the item; and
(c) removing item identifiers from the list for which the source of the item is excluded by the exclusion specification.

Each source of items in the list created by the system may be assigned a rank equal to the number of distinct sources of items above the first occurrence of an item from that source in the initial list, and the characteristic of sources in the exclusion specification may be a specified maximum rank in the initial list, so that all items from a source with a rank less than or equal to the specified maximum rank are removed from the list. The characteristic may be a maximum value of a quantitative measure of the popularity of the sources, a smaller value of which measure means that the source is more popular, so that items from sources having a popularity value less than or equal to the specified maximum value are excluded from the list.

The invention also provides a non-volatile computer-readable memory that has software instructions stored therein, the software instructions being adapted to run on a computer processor to cause the processor to perform the methods described above.

DETAILED DESCRIPTION OF THE INVENTION

The invention provides computer-based methods, and systems for implementing those methods, for generating and displaying lists of items accessible on a computer network that are related to a query entered by a user, where the sources of the listed items may be restricted by specifying an exclusion specification comprising a specification of a characteristic of sources of the items.

In a preferred embodiment, the method searches and identifies relevant items on the web, such as web pages and images, that are identified by uniform resource locators (URLs) that can be accessed on the internet using the HTTP protocol. Such items may be indexed in an inverted index for searching purposes, as is typically done by web search engines, which index maintains lists of search terms with associated lists of relevant items. Along with each relevant item, information such as the source of the item and a popularity measure of that source or of the item may be stored.

Figure 2:
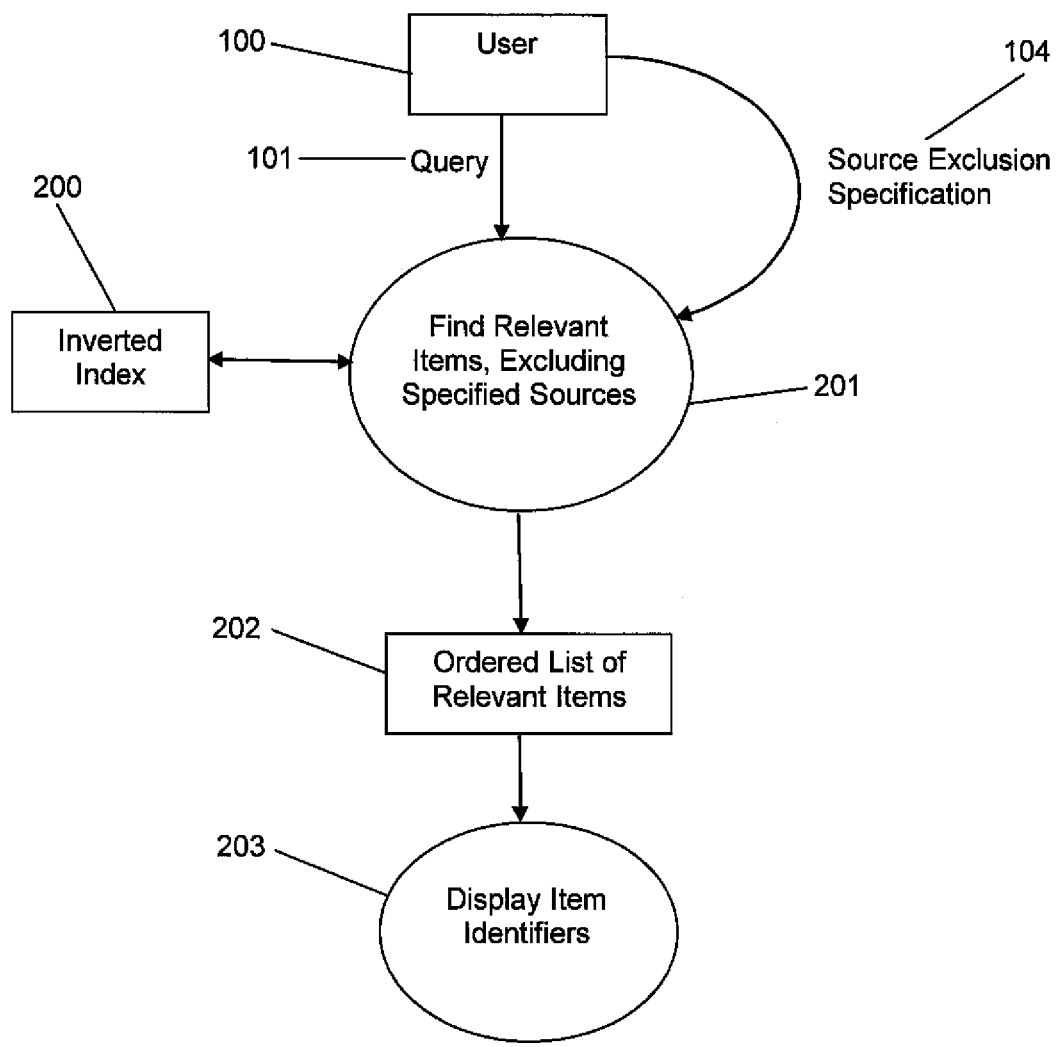
FIG. 2 depicts the main steps in another embodiment of the invention.

FIG. 2 depicts an embodiment of a system implementing a method employing such an inverted index 200 that includes certain information about the sources of items in the index, which may include quantitative measures, such as a popularity rank of the domain within which the item was posted. Many well-known algorithms may be employed to assess the popularity rank of a domain, and rankings can also be obtained from online sources that post them or otherwise make them available via the internet. Alternatively, the rank may be based on an evaluation of the quality of the website associated with the source (domain), or a measure of popularity or quality of a particular item itself, such as a news story that has been linked many times.

The user 100 provides a query 101 and may provide a source exclusion specification 104 to the system. Alternatively, the system may employ a pre-determined source exclusion specification. A query consists of words and phrases, such as "solar system". A source exclusion specification 104 specifies at least one characteristic of sources that instructs the system to exclude items from sources that have this characteristic. For example, one characteristic is that the source rank, as determined by the system, be N or less, where N is a number such as 10, 100, 1000, 10,000, 100,000 or 1,000,000. The system then finds relevant items, excluding specified sources 201, by searching the index for items that are relevant to the query 101, but which do not have the specified characteristic (i.e. do not have a rank of N or less in this example). If the user specifies an exclusion specification 104 of "having source rank less than 1000", for example, then all sources ranked in the index from 0 to 999 will be excluded, and the search will return only items from sources with a rank of 1000 or greater. The system sorts these items in order of relevance to the query 101 to produce an ordered list of relevant items 202. These items can then be displayed 203 to the user 100, for example, 10 items at a time. The ordered list 202 contains identifiers for the relevant items, which are typically URLs that can be used to directly access the items. It may also include related information, such as portions of the item containing the words that caused the system to determine that the item was relevant to the query 101. Typically, this may include sentences in the item containing words in the query 101.

Figure 1:
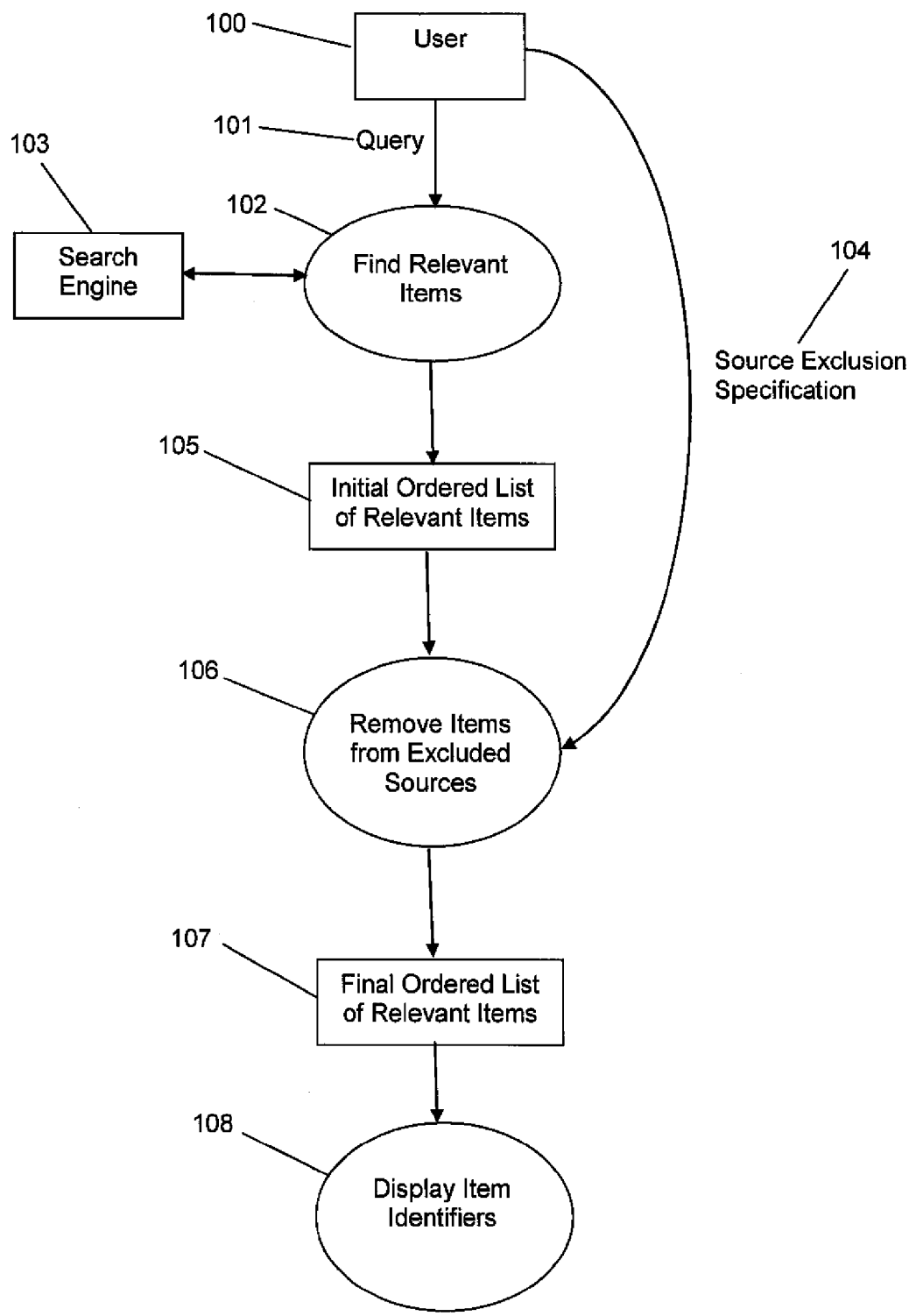
FIG. 1 depicts the main steps in one embodiment of the invention.

FIG. 1 depicts an alternate embodiment that uses a third-party search engine 103. In this case, the system first uses the search engine 103 to find relevant items 102 based on the query 101 provided by the user, sorted by relevance, to produce an initial ordered list of relevant items 105. The system receives a source exclusion specification 104 from the user 100, which may be a direction, for example, to exclude the top (most popular) N sites, or sources. In this case, the system may determine which sources are the top sites to be excluded based on the appearance of those sites in the initial list 105. For example, each source may be assigned a rank by the system equal to the number of distinct sources of items above the first occurrence of an item from that source in the initial list 105. The characteristic of sources in the exclusion specification is then a specified maximum rank in the initial list

105, so that all items from a source with a rank less than or equal to the specified maximum rank are removed from the list 106 to produce a final ordered list of relevant items 107. A portion of these may be displayed 108 to the user.

The source can generally be determined from the URL by parsing the domain or host name from the URL.

While the exclusion of the most popular sites from search results may seem counter-intuitive, experimentation has shown that it can uncover very useful information that could not easily have been otherwise discovered.

While the use of an exclusion specification that excludes popular sources is part of a preferred embodiment of the invention, the invention also includes, for example, doing the opposite. For example, an alternative characteristic is that the source rank, as determined by the system, be N or greater, where N is a number such as 1000, 10,000, 100,000 or 1,000,000. Where the rank is a popularity rank, this would result in the inclusion of only items from sites with a popularity rank of less than N, i.e. the N most popular sites. For some purposes such an approach may be useful where the user is only interested in popular sites.

A "characteristic of sources", as used herein is a generic characteristic that may be anything that can be determined by software based on the content of an item or the source of an item, which may or may not be dependent on the user's query 101, but does not include aspects that can be determined solely from the URL of the item, such as the name of the site or the country of registration of the domain name, or aspects that are based solely on direct analysis of the particular item, such as the language(s) contained in the item. Therefore an exclusion specification cannot contain (1) an identifier of a particular item or entity, such as a URL, domain name or company name, or (2) a specification of a language. In general, a characteristic of sources cannot contain limitations on individual items dependent only on the individual items; the characteristic must relate to the source per se and by shared by a plurality of sources.

Characteristics do include limits on any quantitative measure of the popularity or quality of the source of the item, such as a ranking of the domain based on traffic, or the quantity or quality of links to and/or from the items published by the source of the item, and the appearance of the source in third-party lists, such as those ranking website quality or usage. Any quantitative measure (i.e. that assigns a value or a rank to sites) of sources may be used to specify a characteristic which is a range or set of values of the quantitative measure. Typically, the characteristic will be a maximum or minimum value of the measure, but it could alternatively be a range or an upper or lower percentage (e.g. to exclude the top 10% most popular sites). The measure may be dependent on or independent of the query. An example of an independent measure is the overall popularity rank of a site. An example of a dependent measure for a site is the rank of the highest ranked search result from that site for the given query by a third-party search engine.

The system may also keep a record of the sources that have been excluded and may display a partial list of those excluded sources to the user, for example beside the list of displayed results. The user may then be given the opportunity to indicate that one or more of the listed excluded sites should not be excluded. In that case, the system updates the list of identifiers to include items from the source that the user indicated should not be excluded. The user may also be allowed to scroll through a complete list of the excluded sources, or even to search within the complete list, to identify sources that should not be excluded. The excluded source list may be sorted by popularity of the excluded site, or may be sorted alphabetically, and the user may be given the option of determining the order in which the list is displayed.

Figure 3:
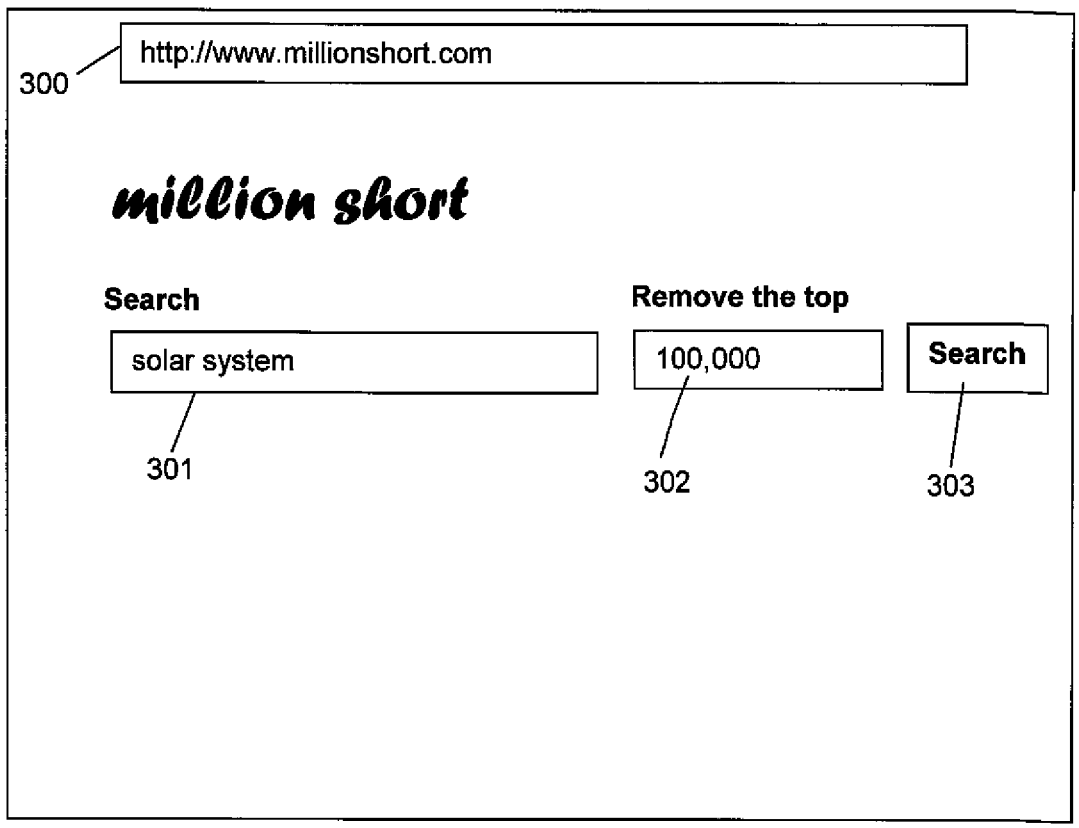
FIG. 3 shows an example of a screen displayed by a web browser accessing a website that implements an embodiment of the invention.

FIG. 3 shows a basic example of a screen that may be presented by a web browser to a user when the user instructs the browser to go to a site 300 that implements an embodiment of the invention. The web page provides a search box 301 into which the user may type a query 101, such as "solar system", containing words and/or phrases for which the user wants to find relevant items on the internet. The user can then enter a number of the most popular sources to exclude into a separate text box 302, such as 100,000, and click on the search button 303 to instruct the system to perform the method and display a portion of the list of identified relevant items, starting with the first item in the list, the first item being the most relevant item from sources that are not in the 100,000 most popular. In the example shown in FIG. 3, the system only gives the user one choice of a quantitative measure to use, and allows the user to define a characteristic by specifying a maximum value to construct an exclusion specification. In other embodiments, the system may give the user a list of quantitative measures from which to select one or more and then allow the user to construct an exclusion specification based on the selected measures.

It should be noted that the source exclusion specification 104 need not be provided explicitly by the user 100. For example, a website may offer a search service that pre-excludes the N most popular sources, or includes only the M least popular websites based on some quantitative measure of popularity. By making a search via such a website, the user has implicitly specified a source exclusion specification 104 that is built into the website. This is essentially the same as shown in FIG. 3, where the web page provides a drop-down box of the number of sites to exclude, except that the user is given only one choice for the exclusion specification.

It should be noted that although we refer to the exclusion specification comprising a specification of a characteristic of sources, the specification is not limited to using a single characteristic. In some embodiments, the system may allow the user to specify a logical combination of characteristics, such as "popularity rank less than 1000 AND quality rank in the bottom 50%", to exclude sources.

There are many possible ways to define and calculate quantitative measures of the popularity of a source or website. Factors such as the number of inbound links, the amount of time a visitor spends on a site, the number of times visitors return to the site, and references to web pages on social networks such as Facebook™ and Twitter™. Even the use of non-web references such as references on real-time networks may be factored into a measure of popularity.

Another characteristic that may be used in an exclusion specification is a quantitative measure of the quality of a site. One such measure is "freshness" based on identifying date information on web pages. More recently, real-time networks such as Twitter™ are redefining what content is fresh and new.

When referring to sources and items being "excluded" by an exclusion specification, the meaning of this is that items from excluded sources are not included in a list (or sub-list) of identifiers of items relevant to the query that will be displayed to the user. Such a list of identifiers is intended to preferably include at least one page of items, which is typically 10 items (or identifiers thereof), and need not include every relevant and accessible item that is not from an excluded source. Such an item list may be part of (a sub-list of) a much larger list. For example, rather than removing items from an initial list when they are from an excluded source, the system may just move such items to the end of the list. Such a list would contain the same number of entries as would have been listed without the exclusion specification, but items from "excluded" sources are placed in a portion of the list that will not be displayed to the user. In such a case, the full list contains a sub-list, which is also a list, consisting of all the items up to, but not including, the first item from an excluded source. Other lists of identifiers of items relevant to the query, the items being accessible on the computer network from sources that are not excluded by the exclusion specification, would include, for example, the first N=10, 20, 30, 100, 1000, etc. entries in a larger list that has been reordered to move items from excluded sources down the list, assuming none of the first N items are from an excluded source. Since the list is generally presented to a user starting from the beginning, there is generally little point in actually constructing a final list of more than say 1000 entries, and it may make sense to only construct sub-lists with the number of entries to be displayed on the screen in real-time as the user requests to see the next page of results.

Generally, a computer, computer system, computing device, client or server, as will be well understood by a person skilled in the art, includes one or more computer processors, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell the invention or parts thereof.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the items, and alternatives to the items, in the list that a skilled person would understand would be suitable for the purpose that the items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A method performed by a computer processor to identify web pages accessible on a computer network that are relevant to a query entered by a user, each web page having a source being a website identified by a website domain name, the method comprising the steps of:
   (a) receiving an exclusion specification from the user, the exclusion specification comprising a specification of at least one characteristic of sources, wherein the at least one characteristic of sources does not include an identifier of a particular web page or an entity, a domain name or a company name, and wherein the at least one characteristic of sources relates to the source per se and is shared by a plurality of sources;

(b) receiving the query from the user;

(c) creating a list of identifiers of web pages relevant to the query, wherein the creating a list of identifiers comprises:

(i) identifying an initial list of identifiers of web pages accessible on the computer network, wherein the web pages are accessible on the computer network from the sources that are not excluded by the exclusion specification, wherein the web pages are sorted by declining relevance of the web pages to the query;

(ii) identifying the source of the web page for each listed web page, wherein each source is assigned a rank equal to the number of distinct sources of web pages above the first occurrence of a web page from that source in the initial list;

(iii) removing web page identifiers from the list for which the source of the web page is excluded by the exclusion specification, wherein a first characteristic of sources in the exclusion specification is a specified maximum rank in the initial list, so that all web pages from a source with a rank less than or equal to the specified maximum rank are removed from the list, wherein a second characteristic of sources in the exclusion specification is a maximum value of a quantitative measure of the quality of the sources, a smaller value of which measure means that the source is of higher quality, so that web pages from sources having a quality value less than or equal to the specified maximum value are excluded from the list of identifiers of web pages relevant to the query; and (iv) creating a list of sources that were excluded by the exclusion specification;

(d) displaying a portion of the list of identifiers of web pages relevant to the query starting with the first web page in the list, the first web page being the most relevant web page;

(e) displaying a portion of the list of sources that were excluded by the exclusion specification that was received from the user and used to produce the list of identifiers of web pages relevant to the query;

(f) receiving from the user an indication that one of the sources in the list of excluded sources should not be excluded;

(g) updating the list of identifiers of web pages relevant to the query to include web pages from the source that the user indicated should not be excluded; and (h) displaying a portion of the updated list of identifiers of web pages relevant to the query.

2. The method of claim 1, wherein the exclusion specification is pre-determined.

3. The method of claim 1, wherein a third characteristic of sources in the exclusion specification is a maximum value of a quantitative measure of the popularity of the sources, a smaller value of which measure means that the source is more popular, so that web pages from sources having a popularity value less than or equal to the specified maximum value are excluded from the list of identifiers of web pages relevant to the query.

4. The method of claim 1, wherein the specified maximum rank is 100,000.

5. The method of claim 1, wherein the computer network is the internet, the identifiers are uniform resource locators, and the sources are identified by extracting domain names from the uniform resource locators.

6. The method of claim 1, wherein the relevance of the query to a web page is determined by the appearance in the web page, or in text associated with the web page, of words or phrases contained in the query.

7. The method of claim 1, wherein the step of creating a list of identifiers of web pages relevant to the query is performed by querying a third-party search engine.

8. A non-transitory computer-readable memory that has software instructions stored therein, the software instructions being adapted to run on a computer processor to cause the processor to perform the method of claim 1.

9. The method of claim 1, wherein the exclusion specification is provided by the user by selecting a pre-defined exclusion specification presented by a website that implements the method.

10. The method of claim 1, wherein the exclusion specification comprises a logical combination of the at least one characteristic of sources.

11. A system comprising a programmable computer processor, the processor running software adapted to:

(a) receive an exclusion specification from the user, the exclusion specification comprising a specification of at least one characteristic of sources, a source being a website identified by a website domain name, wherein the at least one characteristic of sources does not include an identifier of a particular web page or an entity, a domain name or a company name, and wherein the at least one characteristic of sources relates to the source per se and is shared by a plurality of sources;

(b) receive a query from a user;

(c) create a list of identifiers of web pages relevant to the query, wherein the creation of the list of identifiers comprises:

(i) identifying an initial list of identifiers of web pages accessible on the computer network, wherein the web pages are accessible on the computer network from the sources that are not excluded by the exclusion specification, wherein the web pages are sorted by declining relevance of the web pages to the query;

(ii) identifying the source of the web page for each listed web page, wherein each source is assigned a rank equal to the number of distinct sources of web pages above the first occurrence of a web page from that source in the initial list;

(iii) removing web page identifiers from the list for which the source of the web page is excluded by the exclusion specification, wherein a first characteristic of sources in the exclusion specification is a specified maximum rank in the initial list, so that all web pages from a source with a rank less than or equal to the specified maximum rank are removed from the list, wherein a second characteristic of sources in the exclusion specification is a maximum value of a quantitative measure of the quality of the sources, a smaller value of which measure means that the source is of higher quality, so that web pages from sources having a quality value less than or equal to the specified maximum value are excluded from the list of identifiers of web pages relevant to the query; and (iv) creating a list of sources that were excluded by the exclusion;

(d) display a portion of the list of identifiers of web pages relevant to the query starting with the first web page in the list, the first web page being the most relevant web page;
(e) display a portion of the list of sources that were excluded by the exclusion specification that was received from the user and used to produce the list of identifiers of web pages relevant to the query;
(f) receive from the user an indication that one of the sources in the list of excluded sources should not be excluded;
(g) update the list of identifiers of web pages relevant to the query to include web pages from the source that the user indicated should not be excluded; and
(h) display a portion of the updated list of identifiers of web pages relevant to the query.

12. The system of claim 11, wherein a third characteristic of sources in the exclusion specification is a maximum value of a quantitative measure of the popularity of the sources, a smaller value of which measure means that the source is more popular, so that web pages from sources having a popularity value less than or equal to the specified maximum value are excluded from the list of identifiers of web pages relevant to the query.

13. The system of claim 11, wherein the computer network is the internet, the identifiers are uniform resource locators, and the sources are identified by extracting domain names from the uniform resource locators.

14. The system of claim 11, wherein the exclusion specification is pre-determined.

15. The system of claim 11, wherein the specified maximum rank is 100,000.

16. The system of claim 11, wherein the relevance of the query to a web page is determined by the appearance in the web page, or in text associated with the web page, of words or phrases contained in the query.

17. The system of claim 11, wherein the step of creating a list of identifiers of web pages relevant to the query is performed by querying a third-party search engine.

18. The system of claim 11, wherein the exclusion specification is provided by the user by selecting a pre-defined exclusion specification presented by a website that implements the method.

19. The system of claim 11, wherein the exclusion specification comprises a logical combination of the at least one characteristic of sources.

* * * * *